(12) United States Patent
Padilla (10) Patent No.: US 8,066,312 B2
(45) Date of Patent: Nov. 29, 2011

(54) HOSE HANDLING APPARATUS

(76) Inventor: William Padilla, Bronx, NY (US)

( * ) Notice: Subject to any disclaimer, the term of this patent is extended or adjusted under 35 U.S.C. 154(b) by 0 days.

(21) Appl. No.: 12/575,485

(22) Filed: Oct. 8, 2009

(65) Prior Publication Data

US 2010/0086391 A1    Apr. 8, 2010

Related U.S. Application Data (60) Provisional application No. 61/103,644, filed on Oct. 8, 2008, provisional application No. 61/147,474, filed on Jan. 27, 2009.

(51) Int. Cl.
*B65G 7/12* (2006.01)
*A62C 33/00* (2006.01)

(52) U.S. Cl. ........................... 294/15; 294/92

(58) Field of Classification Search .............. 294/15, 294/16, 92; 169/46; 248/75, 76
See application file for complete search history.

(56) References Cited

U.S. PATENT DOCUMENTS

| | | | | |
|---|---|---|---|---|
| 2,349,887 A | * | 5/1944 | Selberg | 81/119 |
| 3,363,927 A | * | 1/1968 | Wesemann | 294/137 |
| 4,243,164 A | * | 1/1981 | Burlison et al. | 294/15 |
| 4,712,819 A | * | 12/1987 | Pope | 294/15 |
| 4,856,834 A | | 8/1989 | Lancaster et al. | |
| 5,833,145 A | | 11/1998 | Smith | |
| 5,979,840 A | | 11/1999 | Hollister et al. | |
| 6,447,033 B1 | | 9/2002 | Konczak | |
| 2002/0095743 A1 | | 7/2002 | Schneider et al. | |
| 2002/0145294 A1 | * | 10/2002 | Clark et al. | 294/15 |
| 2010/0213727 A1 | * | 8/2010 | Laese | 294/15 |

FOREIGN PATENT DOCUMENTS

| | | | |
|---|---|---|---|
| DE | 202007012123 | * | 3/2008 |
| JP | 2002173271 A2 | | 6/2002 |

* cited by examiner

*Primary Examiner* — Paul T Chin
(74) *Attorney, Agent, or Firm* — Ash Tankhe; Lipton, Weinberger & Husick (57) ABSTRACT

A hose handling apparatus for gripping, advancing, and maneuvering a high pressure hose is provided. The hose handling apparatus comprises a support member comprising a first end, a middle section, and a second end, a generally cylindrical handle detachably connected to and substantially perpendicular to the first end of the support member forming a rigid connection with the support member to provide grip to a user's hand, a first generally cylindrical curvilinear gripping element detachably connected to and substantially perpendicular to the middle section of the support member, and a second generally cylindrical curvilinear gripping element detachably connected to and substantially perpendicular to the second end of the support member. The support member is angled at the middle section. The handle and the gripping elements form a parallel configuration which is perpendicular to a planar surface of the support member. The gripping elements grip the hose positioned between them firmly.

17 Claims, 13 Drawing Sheets

HOSE HANDLING APPARATUS

CROSS REFERENCE TO RELATED APPLICATIONS

This application claims the benefit of the following provisional patent applications:
1. Provisional patent application No. 61/103,644 titled "Hose Handling Apparatus", filed on Oct. 8, 2008 in the United States Patent and Trademark Office.
2. Provisional patent application No. 61/147,474 titled "Hose Handling Device", filed on Jan. 27, 2009 in the United States Patent and Trademark Office.

The specification of the above two referenced applications are incorporated herein by reference in their entirety.

BACKGROUND

A hose is a flexible tube used for conveying liquids or gases under pressure. The shape of a hose is typically cylindrical. Hoses are made of different materials, for example, nylon, polyurethane, polyethylene, neoprene, canvas, or rubber based on the environment and pressure rating. Hoses are used in gardening, firefighting, underwater diving, agriculture, industries, hydraulics, chemical engineering, and construction. High pressure hoses, made of tight-woven canvas either with rubber lining inside or without lining, are typically used in firefighting where water is discharged through the hose at high pressures using high pressure pumps which, in turn, creates a back pressure on the hose at or near the discharge or outlet section of the hose.

High pressure hoses are often required to be manually held, lifted, or grasped for long periods of time while fighting and extinguishing fires in oil refineries, petrochemical plants, and building structures, for example, apartment buildings, warehouses, etc. Handling these high pressure hoses with a user's hand is difficult. Furthermore, a high pressure hose is difficult to grasp or maneuver when the outside surface of the hose is wet, for example, when the hose is exposed to water from rain, or water discharged from the hose. Firefighters also find it difficult to hold on to, or position the hose due to the back pressure exerted on the hose as the high pressure water is discharged from the hose. Furthermore, maneuvering the high pressure hose to different positions and moving the hose is difficult.

Hence, there is a need for an apparatus that enables a user to handle a hose that is discharging water at a high pressure with an improved grip. There is also a need for an apparatus that enables the user to advance and maneuver the hose without difficulty.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The hose handling apparatus and method disclosed herein addresses the above stated needs for handling a hose with an improved grip. The hose handling apparatus disclosed herein enables a user to grip, advance, and maneuver the hose without difficulty. The term "user" as used herein refers to a person, for example, a firefighter, using the hose handling apparatus.

The hose handling apparatus comprises a support member, a generally cylindrical handle, a first generally cylindrical curvilinear gripping element, and a second generally cylindrical curvilinear gripping element. The support member comprises a first end, a middle section, and a second end. The support member is angled at its middle section. The generally cylindrical handle, herein referred to as a "handle", is detachably connected to and substantially perpendicular to the support member at the first end of the support member to form a rigid connection with the support member. The handle provides grip to a user's hand and enables the user to maneuver a hose. The hose referred to herein is, for example, a high pressure hose. In an embodiment, the handle comprises finger slots for accommodating the user's fingers while the user grips the handle for maneuvering the hose.

The first generally cylindrical curvilinear gripping element, herein referred to as a "first gripping element", is detachably connected to and substantially perpendicular to the support member at the middle section of the support member. The second generally cylindrical curvilinear gripping element, herein referred to as a "second gripping element", is detachably connected to and substantially perpendicular to the support member at the second end of the support member. The handle, the first gripping element, and the second gripping element are rigidly connected to the support member using multiple fasteners.

The handle, the first gripping element, and the second gripping element form a parallel configuration which is perpendicular to a planar surface of the support member. Each of the first gripping element and the second gripping element comprises a concaved mid-section for firmly positioning and securing the hose. The first gripping element and the second gripping element grip the hose positioned between them firmly. A pair of generally circular washers, herein referred to as "washers", made of a flexible material is provided around the first gripping element and the second gripping element to render a firm grip to the hose and to prevent abrasion of the hose.

The hose handling apparatus further comprises a locking assembly that secures the hose between the first gripping element and the second gripping element to prevent the hose from sliding off from the hose handling apparatus while maneuvering the hose. The hose handling apparatus further comprises an elongated slot provided on the middle section of the support member along a longitudinal axis of the support member to facilitate slidable movement, positioning and attachment of the first gripping element with respect to the second gripping element along the elongated slot for accommodating hoses of different sizes.

In another embodiment, the first gripping element is fixed and the second gripping element is rollable. In this embodiment, the hose handling apparatus comprises a spindle detachably connected to and substantially perpendicular to the support member at the second end of the support member to form a rigid connection with the support member. The second gripping element is rollably connected and coaxial to the spindle. The second gripping element rotates about a longitudinal axis common to both the second gripping element and the spindle for enabling the hose positioned between the fixed first gripping element and the rollably connected second gripping element to roll smoothly on the rollably connected second gripping element. The fixed first gripping element supports the top portion of the hose and the rollably connected second gripping element supports the bottom portion of the hose, thereby facilitating the hose to roll smoothly on the rollably connected second gripping element without dragging on the rollably connected second gripping element.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
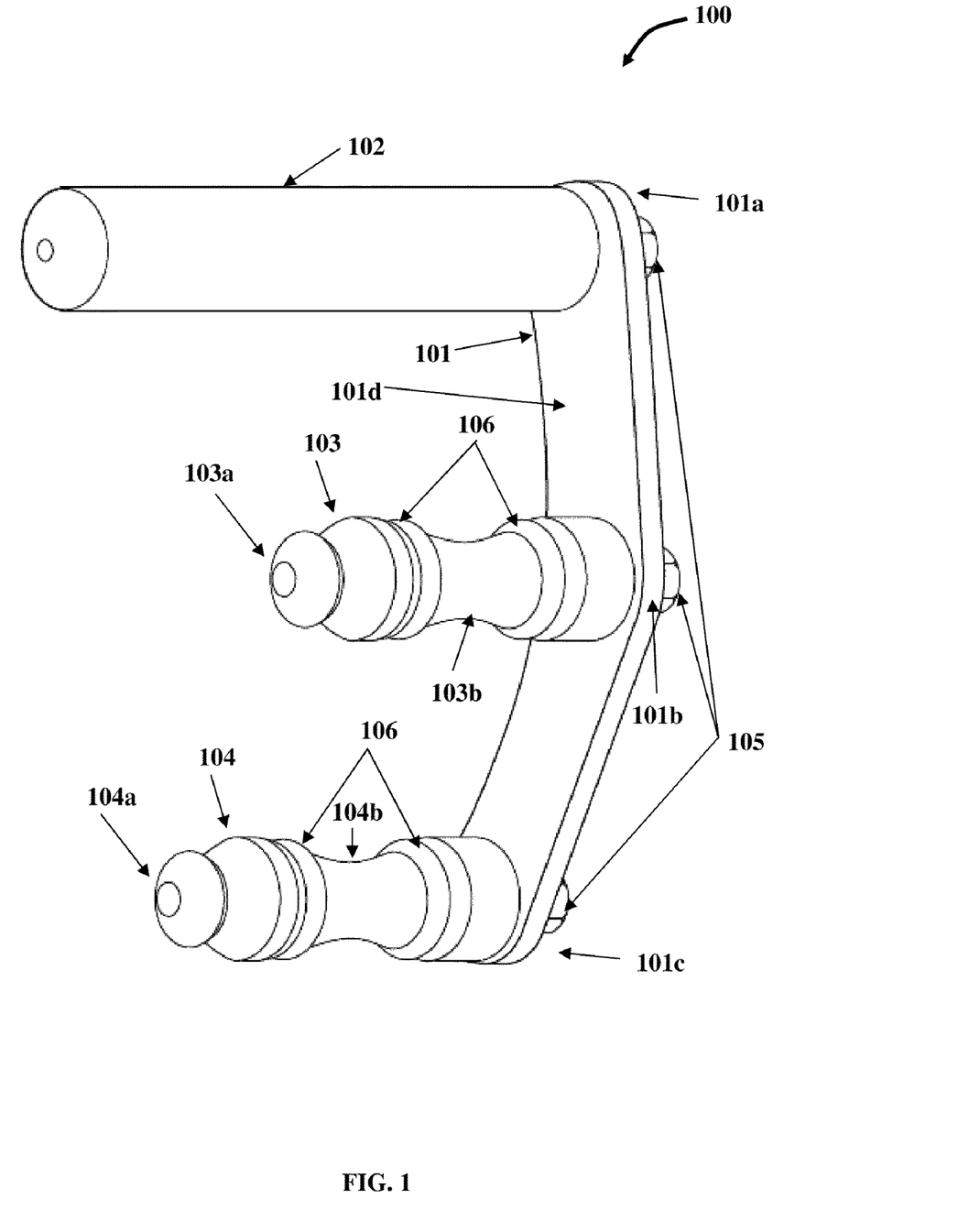
FIG. 1 exemplarily illustrates a perspective view of a hose handling apparatus comprising a support member, a handle, a first gripping element, and a second gripping element, showing the parallel configuration of the handle, the first gripping element, and the second gripping element which is perpendicular to a planar surface of the support member.

FIG. 1 exemplarily illustrates a perspective view of a hose handling apparatus 100 comprising a support member 101, a generally cylindrical handle 102, a first generally cylindrical curvilinear gripping element 103, and a second generally cylindrical curvilinear gripping element 104. Herein, the generally cylindrical handle 102 is referred to as a "handle", the first generally cylindrical curvilinear gripping element 103 is referred to as a "first gripping element", and the second generally cylindrical curvilinear gripping element 104 is referred to as a "second gripping element". The hose 601 referred to herein is, for example, a high pressure hose as exemplarily illustrated in FIG. 6.

The support member 101 comprises a first end 101a, a second end 101c, and a middle section 101b defined by the section between the first end 101a and the second end 101c. The support member 101 is angled at its middle section 101b. The handle 102 is detachably connected to and substantially perpendicular to the support member 101 at the first end 101a of the support member 101 and is rigidly connected to the support member 101. The first gripping element 103 is detachably connected to and substantially perpendicular to the support member 101 at the middle section 101b of the support member 101 and is rigidly connected to the support member 101. The second gripping element 104 is detachably connected to and substantially perpendicular to the support member 101 at the second end 101c of the support member 101 and is rigidly connected to the support member 101. The handle 102, the first gripping element 103, and the second gripping element 104 form a parallel configuration which is perpendicular to a planar surface 101d of the support member 101. The first gripping element 103 and the second gripping element 104 are positioned on the support member 101 to accommodate, secure and hold a hose 601 positioned between the first gripping element 103 and the second gripping element 104 as exemplarily illustrated in FIG. 6. The handle 102 provides grip to the user's hand and enables the user to maneuver the hose 601.

Due to the configuration of the handle 102, the first gripping element 103, and the second gripping element 104 that are generally parallel to one another, the handle 102 allows the user to securely grip the hose handling apparatus 100 for maneuvering and advancing the hose 601 gripped between the first gripping element 103 and the second gripping element 104. Furthermore, the mid-sections 103b and 104b of the first gripping element 103 and the second gripping element 104 respectively are concaved with respect to their longitudinal axes 108 and 109, as exemplarily illustrated in FIGS. 1-3, for firmly positioning and securing the hose 601. The first gripping element 103, the second gripping element 104, and the support member 101 are made of a non-corrosive material, for example, aluminum casting, polycarbonate, nylon, etc. The handle 102 is made of a polymer material, for example, plastic, synthetic rubber, etc.

The hose handling apparatus 100 further comprises multiple fasteners 105 that rigidly connect the handle 102, the first gripping element 103, and the second gripping element 104 to the support member 101. The fasteners 105 are, for example, screws, bolts, threaded studs, etc. A pair of generally circular washers 106, made of a flexible material, is provided around the first gripping element 103 and the second gripping element 104, to provide a firm grip to the hose 601 and prevent abrasion of the hose 601. The washers 106 are made of a non-slip, flexible material, for example, neoprene rubber.

Figure 2:
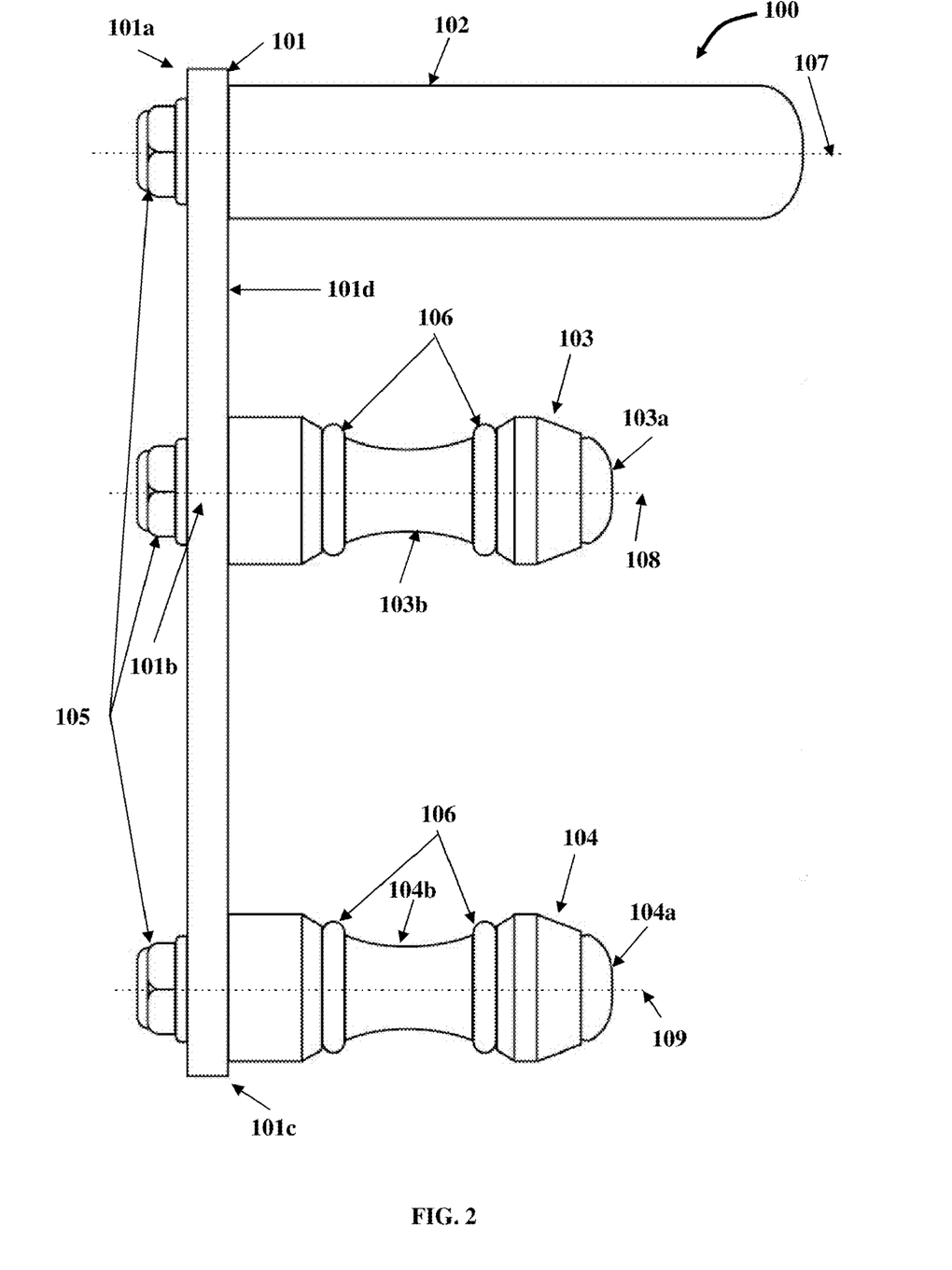
FIGS. 2-3 exemplarily illustrate side orthogonal views of the hose handling apparatus.
Figure 3:
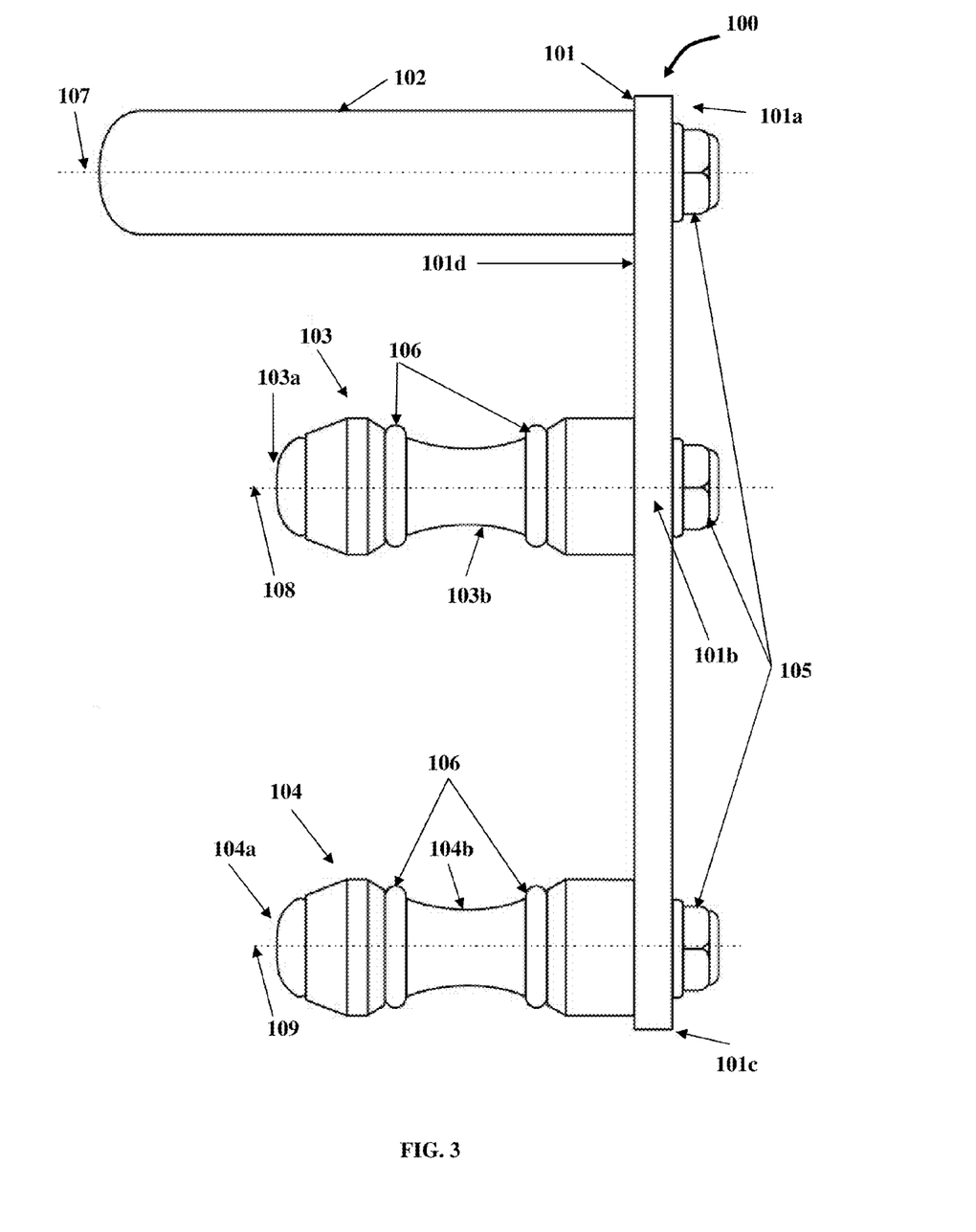

FIGS. 2-3 exemplarily illustrate side orthogonal views of the hose handling apparatus 100, showing the fasteners 105 for fastening the handle 102, the first gripping element 103, and the second gripping element 104 to the support member 101. The fasteners 105 rigidly and perpendicularly connect the handle 102, the first gripping element 103, and the second gripping element 104 to the support member 101. As exemplarily illustrated in FIGS. 2-3, the longitudinal axes 107, 108, and 109 of the handle 102, the first gripping element 103, and the second gripping element 104 respectively, form a parallel configuration which is perpendicular to a planar surface 101d of the support member 101.

Figure 4:
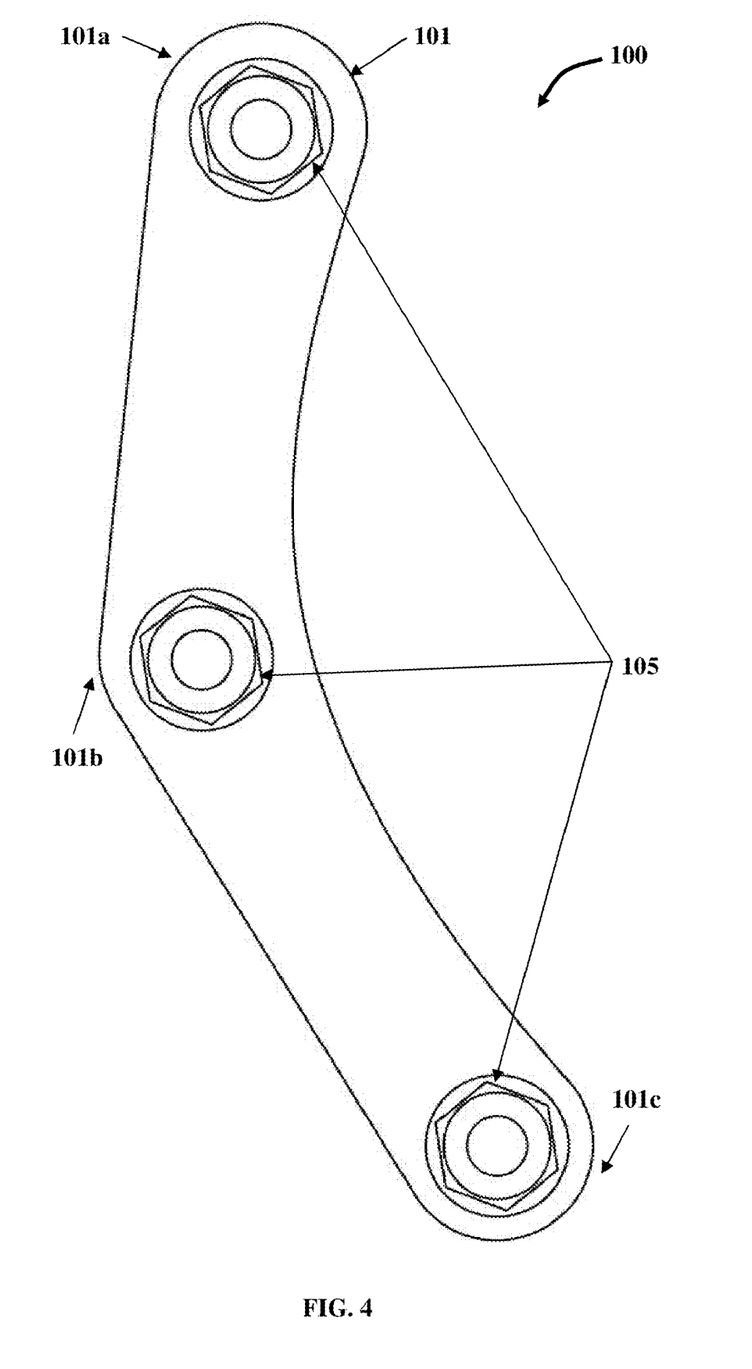
FIG. 4 exemplarily illustrates a rear orthogonal view of the hose handling apparatus.

FIG. 4 exemplarily illustrates a rear orthogonal view of the hose handling apparatus 100. The fasteners 105 are disposed on the support member 101 in a generally angular configuration as exemplarily illustrated in FIG. 4.

Figure 5:
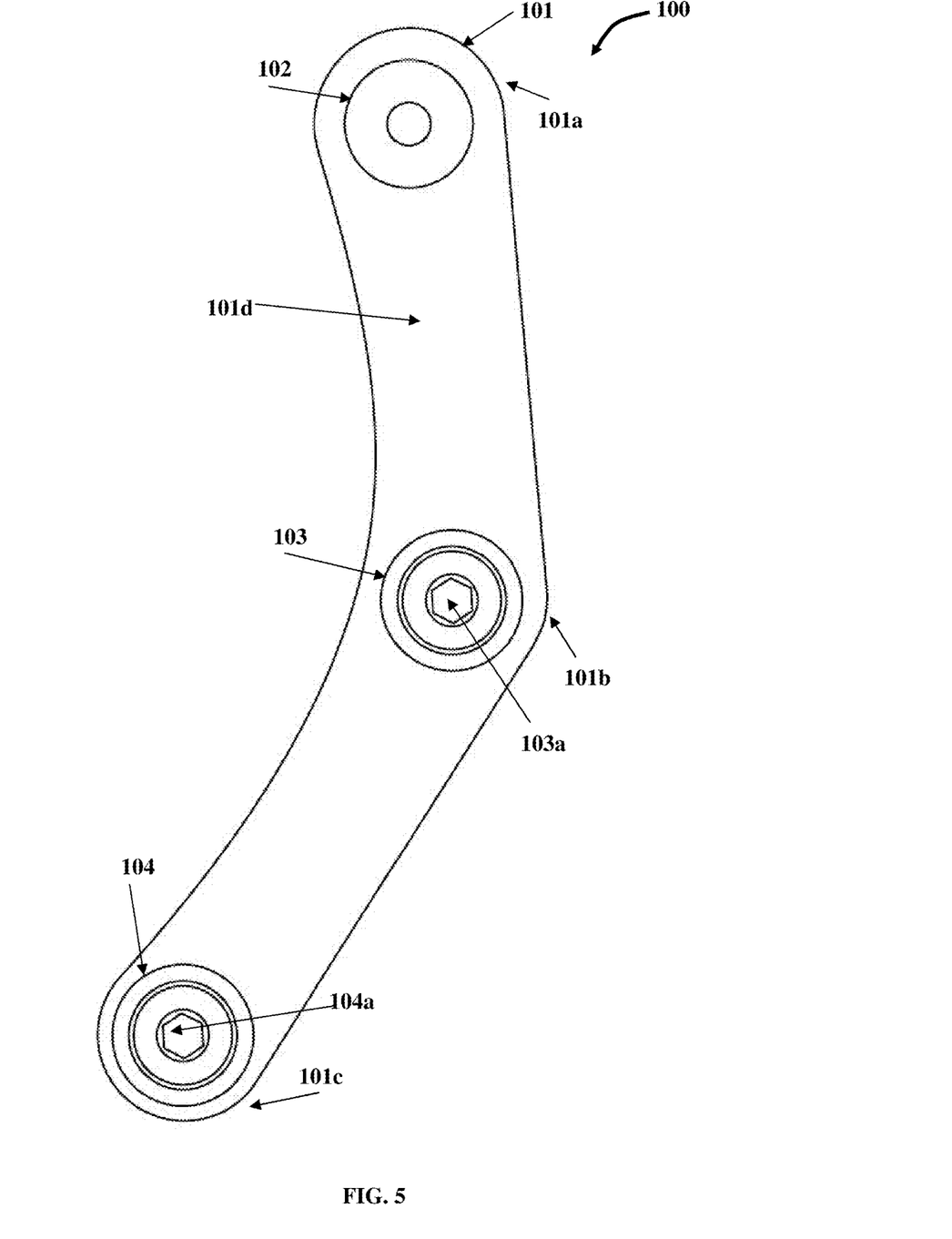
FIG. 5 exemplarily illustrates a front orthogonal view of the hose handling apparatus.

FIG. 5 exemplarily illustrates a front orthogonal view of the hose handling apparatus 100, showing the end views of the handle 102, the first gripping element 103, and the second gripping element 104, angularly disposed on the support member 101.

Figure 6:
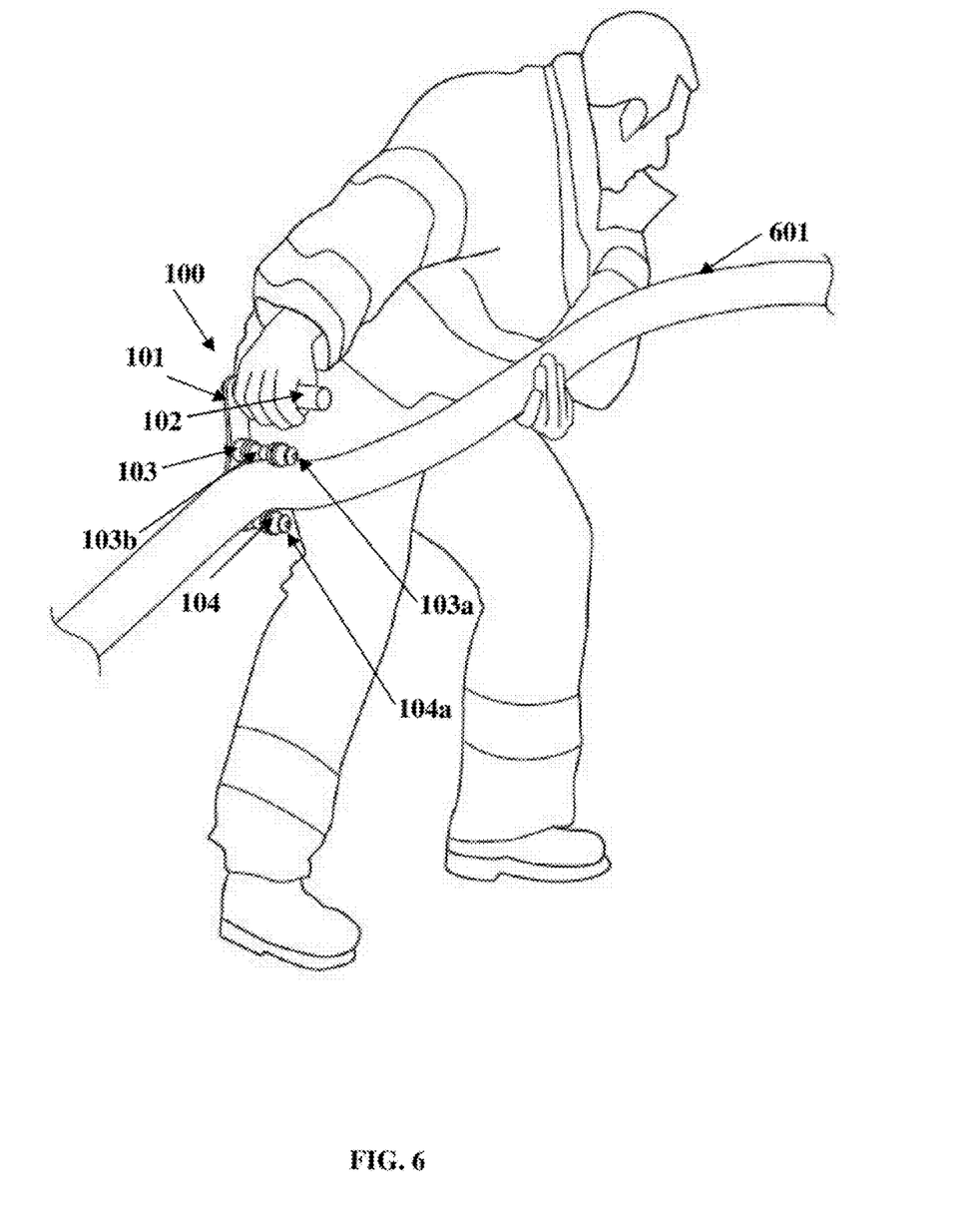
FIG. 6 exemplarily illustrates a user maneuvering a hose using the hose handling apparatus.

FIG. 6 exemplarily illustrates a user maneuvering a hose 601 using the hose handling apparatus 100. The term "user" as used herein refers to a person using the hose handling apparatus 100, for example, a firefighter. The user positions a high pressure hose 601 in between the first gripping element 103 and the second gripping element 104 to grip the hose 601. The user then grips the handle 102 of the hose handling apparatus 100 and maneuvers and advances the high pressure hose 601 to extinguish a fire.

Figure 7:
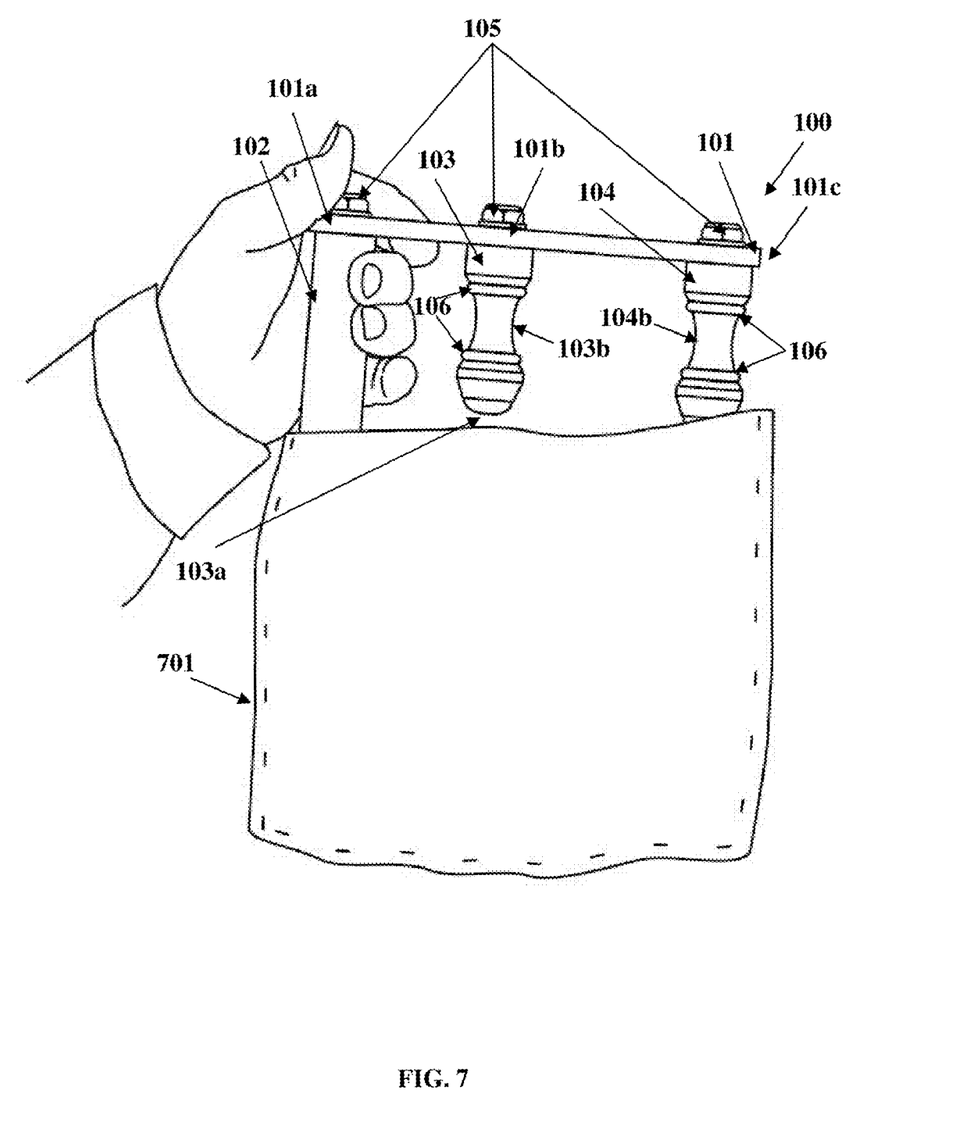
FIG. 7 exemplarily illustrates a user storing the hose handling apparatus in a turnout coat pocket.

FIG. 7 exemplarily illustrates a user storing the hose handling apparatus 100 in a turnout coat pocket 701. When the hose handling apparatus 100 is not in use, the user, for example, stores the hose handling apparatus 100 conveniently in the user's turnout coat pocket 701. The hose handling apparatus 100 can be conveniently placed in the user's turn-coat pocket 701 for storage.

Figure 8:
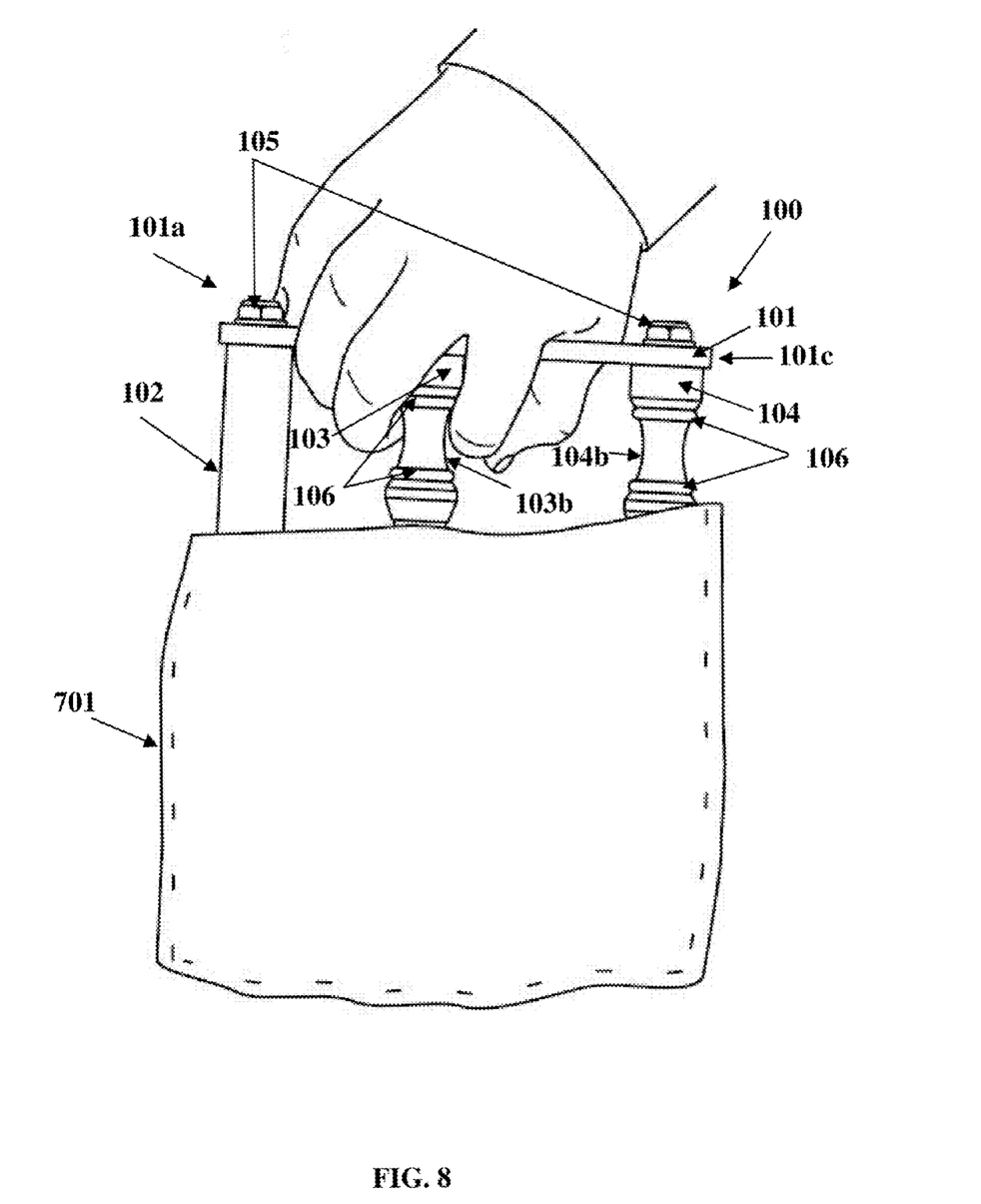
FIG. 8 exemplarily illustrates a user retrieving the hose handling apparatus from a turnout coat pocket.

FIG. 8 exemplarily illustrates a user retrieving the hose handling apparatus 100 from the turnout coat pocket 701. When the hose handling apparatus 100 is required for handling a hose 601 to fight a fire, the user can retrieve the hose handling apparatus 100 easily from the user's turnout coat pocket 701 as exemplarily illustrated in FIG. 8.

Figure 9:
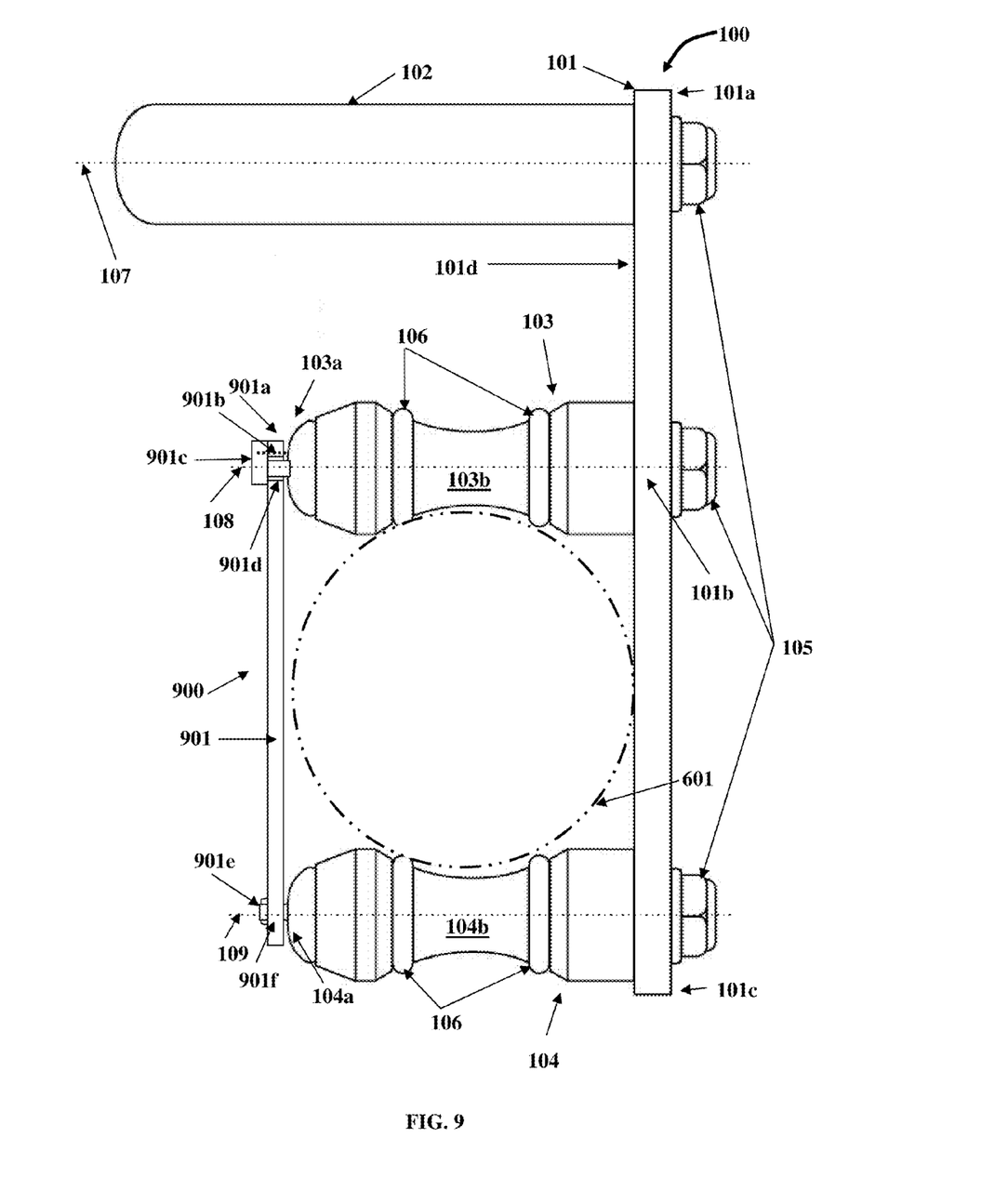
FIG. 9 exemplarily illustrates a hose gripped between the first gripping element and the second gripping element and locked using a locking assembly.

FIG. 9 exemplarily illustrates a hose 601 gripped between the first gripping element 103 and the second gripping element 104 and locked using a locking assembly 900. The locking assembly 900 of the hose handling apparatus 100 comprises an elongated member 901 with opposing ends 901a and 901f. One of the opposing ends 901f of the elongated member 901 is rotatably connected to a free end 104a of the second gripping element 104 using a screw 901e rigidly attached to the free end 104a of the second gripping element 104. Another one of the opposing ends 901a of the elongated member 901 carries a notch 901d with a spring-loaded cover 901c provided adjacent to the notch 901d. The spring-loaded cover 901c is rotatably attached at the other one of the opposing ends 901a of the elongated member 901. The spring-loaded cover 901c locks on to a pin 901b protruding from a free end 103a of the first gripping element 103 to secure the hose 601 between the first gripping element 103 and the second gripping element 104. The locking assembly 900 thus prevents the hose 601 from slipping off the hose handling apparatus 100 while the hose handling apparatus 100 is used to grip, maneuver, and advance the hose 601. The hose handling apparatus 100 thereby facilitates easier handling of the hose 601 by the user and also helps the user to withstand back pressures caused by the hose 601.

Figure 10:
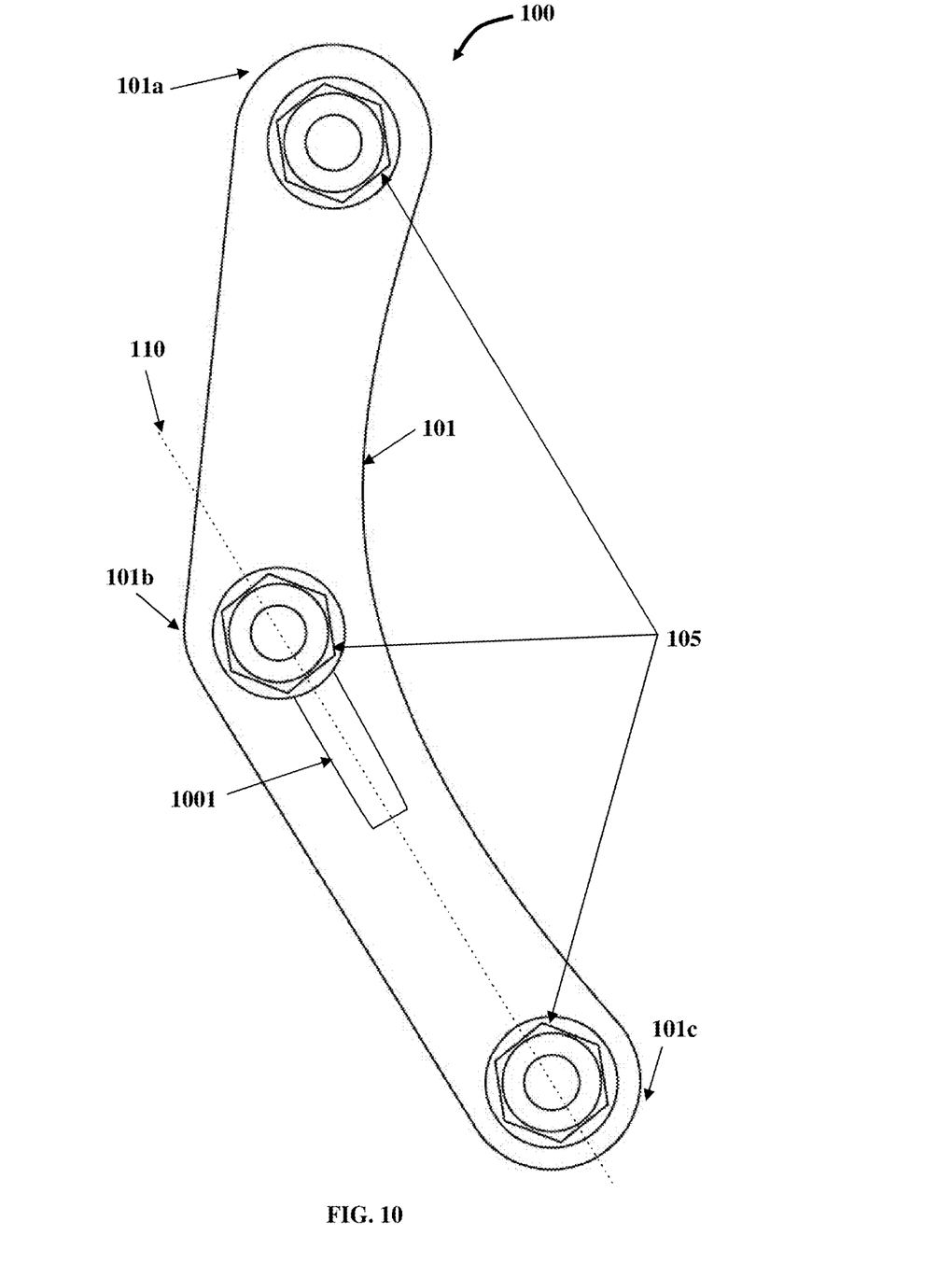
FIG. 10 exemplarily illustrates an embodiment of the hose handling apparatus showing an elongated slot provided on the middle section of the support member.

FIG. 10 exemplarily illustrates an embodiment of the hose handling apparatus 100 showing an elongated slot 1001 provided on the middle section 101b of the support member 101. The elongated slot 1001 is provided on the middle section 101b of the support member 101 along a generally longitudinal axis 110 of the support member 101 to facilitate slidable movement, positioning and attachment of the first gripping element 103 with respect to the second gripping element 104 along the elongated slot 1001 for accommodating hoses of different sizes and diameters between the first gripping element 103 and the second gripping element 104, as exemplarily illustrated in FIG. 10.

To grip a hose 601 of a larger size using the hose handling apparatus 100, a user, loosens the fastener 105 attaching the first gripping element 103 to the support member 101 and slides the first gripping element 103 along the elongated slot 1001 away from the second gripping element 104 to increase the gap between the first gripping element 103 and the second gripping element 104. The user then positions the high pressure hose 601 between the first gripping element 103 and the second gripping element 104. The user then slides the first gripping element 103 along the elongated slot 1001 towards the second gripping element 104 till the concaved mid-section 103b of the first gripping element 103 firmly accommodates the high pressure hose 601. The user then tightens the fastener 105 to rigidly attach the first gripping element 103 to the support member 101, thereby securing the high pressure hose 601 firmly between the first gripping element 103 and the second gripping element 104. The hose handling apparatus 100 therefore accommodates and grips hoses of different sizes.

Figure 11:
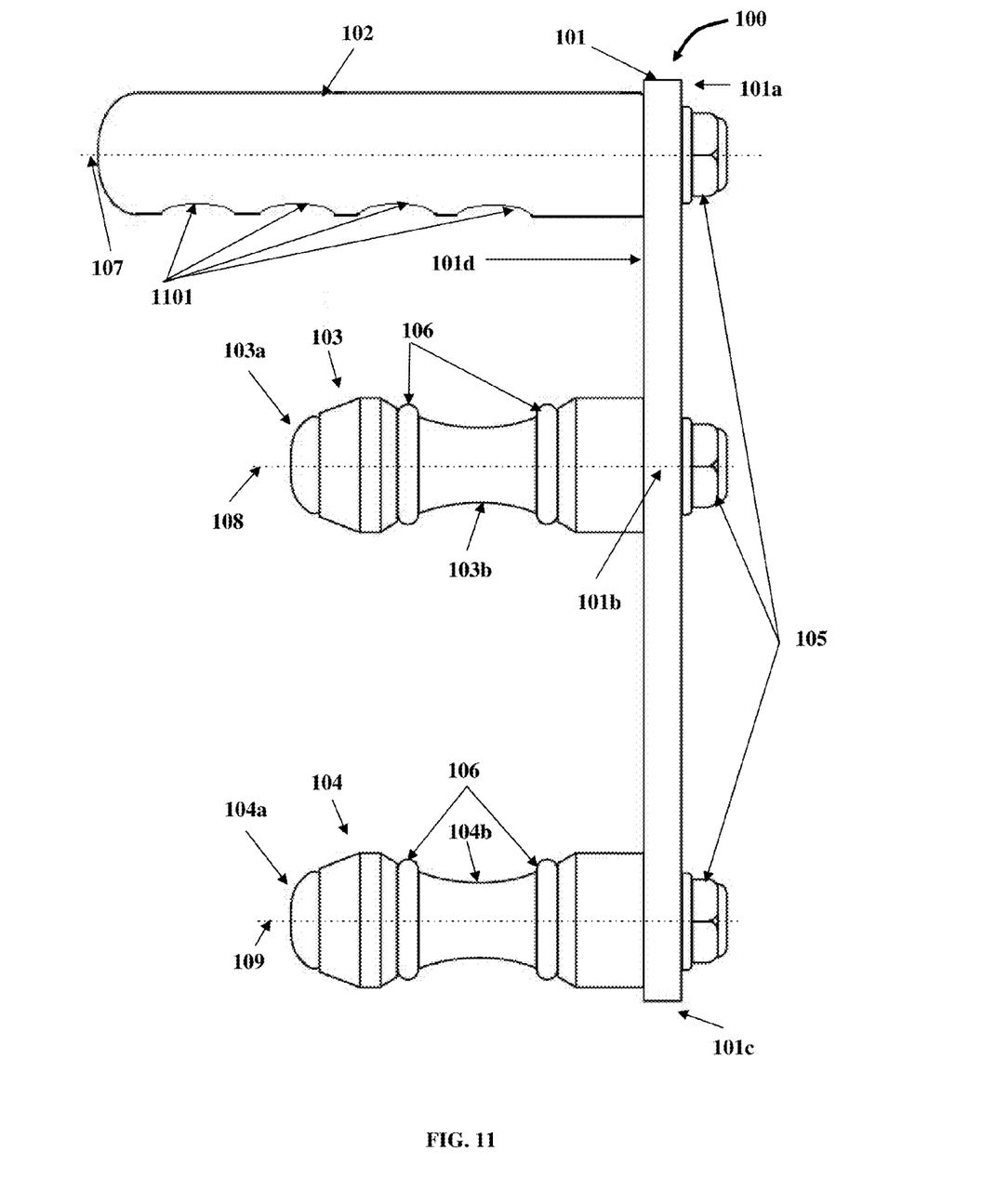
FIG. 11 exemplarily illustrates another embodiment of the hose handling apparatus showing finger slots on the handle for accommodating fingers of the user while the user grips the handle for maneuvering the hose.

FIG. 11 exemplarily illustrates another embodiment of the hose handling apparatus 100 showing finger slots 1101 on the handle 102 for accommodating fingers of the user while the user grips the handle 102 for maneuvering the hose 601. The finger slots 1101 improve the grip of the user on the handle 102, facilitating a firmer and more stable grip when the user needs to hold a high pressure hose 601 to douse a fire with a hydrant.

Figure 12:
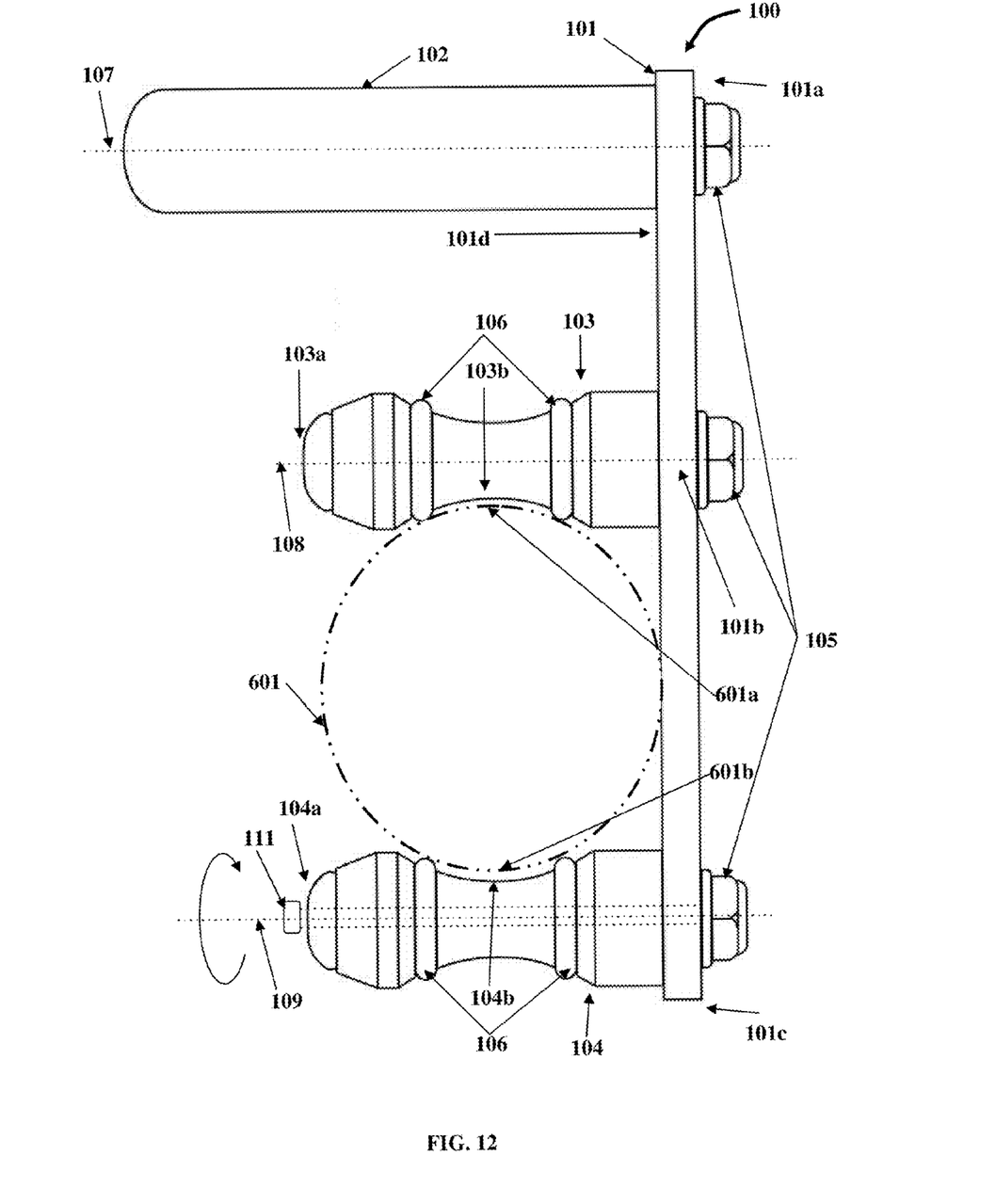
FIG. 12 exemplarily illustrates another embodiment of the hose handling apparatus showing a hose gripped between a fixed first gripping element and a rollably connected second gripping element.

FIG. 12 exemplarily illustrates another embodiment of the hose handling apparatus 100 showing a hose 601 gripped between a fixed first gripping element 103 and a rollably connected second gripping element 104. In this embodiment, the hose handling apparatus 100 comprises a spindle 111 detachably connected to and substantially perpendicular to the support member 101 at the second end 101c of the support member 101 to form a rigid connection with the support member 101. The second gripping element 104 of the hose handling apparatus 100 is rollably connected and coaxial to the spindle 111. The second gripping element 104 rotates about a longitudinal axis 109 common to both the second gripping element 104 and the spindle 111 for enabling the hose 601 positioned between the first gripping element 103 and the rollably connected second gripping element 104 to roll smoothly on the rollably connected second gripping element 104. The second gripping element 104 freely rotates around the spindle 111. The fixed first gripping element 103 supports the top portion 601a of the hose 601 and the rollably connected second gripping element 104 supports the bottom portion 601b of the hose 601, thereby facilitating the hose 601 to roll smoothly on the rollably connected second gripping element 104 without dragging on the rollably connected second gripping element 104. The smooth rolling of the hose 601 on the rollably connected second gripping element 104 avoids damage to the hose 601.

Figure 13:
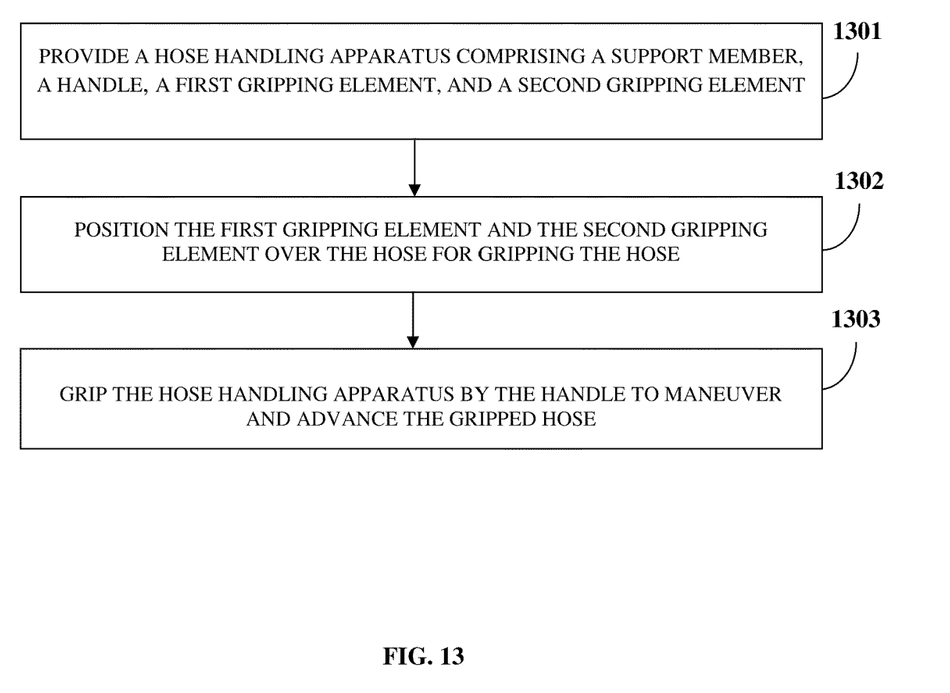
FIG. 13 exemplarily illustrates a method of gripping and advancing a hose using the hose handling apparatus.

FIG. 13 exemplarily illustrates a method of gripping and advancing a hose 601 using the hose handling apparatus 100. A hose handling apparatus 100 as illustrated and disclosed in the detailed description of FIGS. 1-12 is provided 1301. The user positions 1302 the first gripping element 103 and the second gripping element 104 over the hose 601 to securely grip the hose 601. The user then grips 1303 the hose handling apparatus 100 by the handle 102 to maneuver and advance the hose 601 to extinguish a fire. The handle 102 provides a stable grip to the user on the hose handling apparatus 100 for maneuvering and advancing the hose 601 gripped between the first gripping element 103 and the second gripping element 104.

Consider an example where a firefighting unit responds to a call of a fire at a warehouse. The firefighting unit arrives at the scene of a fire and attaches the high pressure hose 601 to a fire hydrant. A firefighter procures the hose handling apparatus 100 from his turnout coat pocket 701 as illustrated in FIGS. 7-8, and positions the high pressure hose 601 on the hose handling apparatus 100. The firefighter then grips the handle 102 of the hose handling apparatus 100 in a firm grip as exemplarily illustrated in FIG. 6. The firefighter then maneuvers and advances the high pressure hose 601 gripped in the hose handling apparatus 100 to spray water at the scene of fire. The hose handling apparatus 100 may be used for handling a hose 601 in applications, for example, firefighting, gardening, transporting oil, hydraulic machinery, etc.

The foregoing examples have been provided merely for the purpose of explanation and in no way are to be construed as limiting of the present invention. While the invention has been described with reference to various embodiments, it is understood that the words, which have been used herein, are words of description and illustration, rather than words of limitation. Additionally, although the invention has been described herein with reference to particular means, materials and embodiments, the invention is not intended to be limited to the particulars disclosed herein; rather, the invention extends to all functionally equivalent structures, methods and uses, such as are within the scope of the appended claims. It will be appreciated by those skilled in the art, having the benefit of the teachings of this specification, that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A hose handling apparatus, comprising:
   a support member, said support member comprising a first end, a middle section, and a second end, said support member angled at said middle section;
   a generally cylindrical handle detachably connected to and substantially perpendicular to said support member at said first end of said support member to form a rigid connection with said support member, wherein said generally cylindrical handle provides grip to a hand of a user and enables said user to maneuver a hose;
   a first generally cylindrical curvilinear gripping element detachably connected to and substantially perpendicular to said support member at said middle section of said support member;
   a second generally cylindrical curvilinear gripping element detachably connected to and substantially perpendicular to said support member at said second end of said support member;
   a locking assembly that secures said hose between said first generally cylindrical curvilinear gripping element and said second generally cylindrical curvilinear gripping element, wherein said locking assembly comprises an elongated member with opposing ends, wherein one of said opposing ends of said elongated member is rotatably connected to a free end of said second generally cylindrical curvilinear gripping element, and wherein another one of said opposing ends of said elongated member carries a notch with a spring-loaded cover provided adjacent to said notch, wherein said spring-loaded cover is rotatably attached at said another one of said opposing ends of said elongated member, and wherein said spring-loaded cover locks on to a pin protruding from a free end of said first generally cylindrical curvilinear gripping element; and
   wherein said generally cylindrical handle, said first generally cylindrical curvilinear gripping element, and said second generally cylindrical curvilinear gripping element form a parallel configuration which is perpendicular to a planar surface of said support member, and wherein said first generally cylindrical curvilinear gripping element and said second generally cylindrical curvilinear gripping element grip said hose positioned between said first generally cylindrical curvilinear gripping element and said second generally cylindrical curvilinear gripping element;
   whereby said generally cylindrical handle provides a stable grip to said user on said hose handling apparatus for maneuvering and advancing said hose gripped between said first generally cylindrical curvilinear gripping element and said second generally cylindrical curvilinear gripping element.

2. The hose handling apparatus of claim 1, further comprising a plurality of fasteners that rigidly connect said generally cylindrical handle, said first generally cylindrical curvilinear gripping element, and said second generally cylindrical curvilinear gripping element to said support member.

3. The hose handling apparatus of claim 1, wherein each of said first generally cylindrical curvilinear gripping element and said second generally cylindrical curvilinear gripping element comprises a concaved mid-section for firmly positioning and securing said hose.

4. The hose handling apparatus of claim 1, further comprising a pair of generally circular washers made of a flexible material, said generally circular washers provided around said first generally cylindrical curvilinear gripping element and said second generally cylindrical curvilinear gripping element, wherein said generally circular washers provide a firm grip to said hose and prevent abrasion of said hose.

5. The hose handling apparatus of claim 1, wherein said locking assembly comprises an elongated member with opposing ends, wherein one of said opposing ends of said elongated member is rotatably connected to said free end of said second generally cylindrical curvilinear gripping element using a screw rigidly attached to said free end of said second generally cylindrical curvilinear gripping element.

6. The hose handling apparatus of claim 1, further comprising an elongated slot provided on said middle section of said support member along a longitudinal axis of said support member to facilitate slidable movement, positioning and attachment of said first generally cylindrical curvilinear gripping element with respect to said second generally cylindrical curvilinear gripping element along said elongated slot for accommodating hoses of a plurality of sizes between said first generally cylindrical curvilinear gripping element and said second generally cylindrical curvilinear gripping element.

7. The hose handling apparatus of claim 1, wherein said generally cylindrical handle comprises finger slots for accommodating fingers of said user while said user grips said generally cylindrical handle for maneuvering said hose.

8. The hose handling apparatus of claim 1, further comprising a spindle detachably connected to and substantially perpendicular to said support member at said second end of said support member to form a rigid connection with said support member, wherein said second generally cylindrical curvilinear gripping element is rollably connected and coaxial to said spindle.

9. A method of handling a hose, comprising:
   providing a hose handling apparatus comprising:
      a support member, said support member comprising a first end, a middle section, and a second end, said support member angles at said middle section;
      a generally cylindrical handle detachably connected to and substantially perpendicular to said support member at said first end of said support member to form a rigid connection with said support member, wherein said generally cylindrical handle provides grip to a hand of a user and enables said user to maneuver a hose;

a first generally cylindrical curvilinear gripping element detachably connected to and substantially perpendicular to said support member at said middle section of said support member to form a rigid connection with said support member;

a second generally cylindrical curvilinear gripping element detachably connected to and substantially perpendicular to said support member at said second end of said support member to form a rigid connection with said support member;

a locking assembly that secures said hose between said first generally cylindrical curvilinear gripping element and said second generally cylindrical curvilinear gripping element, wherein said locking assembly comprises an elongated member with opposing ends, wherein one of said opposing ends of said elongated member is rotatably connected to a free end of said second generally cylindrical curvilinear gripping element, and wherein another one of said opposing ends of said elongated member carries a notch with a spring-loaded cover provided adjacent to said notch, wherein said spring-loaded cover is rotatably attached at said another one of said opposing ends of said elongated member, and wherein said spring-loaded cover locks on to a pin protruding from a free end of said first generally cylindrical curvilinear gripping element; and wherein said generally cylindrical handle, said first generally cylindrical curvilinear gripping element, and said second generally cylindrical curvilinear gripping element form a parallel configuration which is perpendicular to a planar surface of said support member, and wherein said first generally cylindrical curvilinear gripping element and said second generally cylindrical curvilinear gripping element grip said hose positioned between said first generally cylindrical curvilinear gripping element and said second generally cylindrical curvilinear gripping element;

positioning said first generally cylindrical curvilinear gripping element and said second generally cylindrical curvilinear gripping element over said hose for gripping said hose; and gripping said generally cylindrical handle;

whereby said generally cylindrical handle provides a stable grip to said user on said hose handling apparatus for maneuvering and advancing said hose gripped between said first generally cylindrical curvilinear gripping element and said second generally cylindrical curvilinear gripping element.

10. The method of claim 9, further comprising providing a plurality of fasteners that rigidly connects said generally cylindrical handle, said first generally cylindrical curvilinear gripping element, and said second generally cylindrical curvilinear gripping element to said support member.

11. The method of claim 9, wherein each of said first generally cylindrical curvilinear gripping element and said second generally cylindrical curvilinear gripping element comprises a concaved mid-section for firmly positioning and securing said hose.

12. The method of claim 9, further comprising providing a pair of generally circular washers made of a flexible material, said generally circular washers provided around said first generally cylindrical curvilinear gripping element and second generally cylindrical curvilinear gripping element, wherein said generally circular washers provide a firm grip to said hose and prevent abrasion of said hose.

13. The method of claim 9, further comprising providing a screw, wherein said screw is rigidly attached to said free end of said second generally cylindrical curvilinear gripping element for rotatably connecting one of said opposing ends of said elongated member to said free end of said second generally cylindrical curvilinear gripping element.

14. The method of claim 9, further comprising slidably moving, positioning and attaching said first generally cylindrical curvilinear gripping element with respect to said second generally cylindrical curvilinear gripping element along an elongated slot provided on said middle section of said support member for accommodating hoses of a plurality of sizes between said first generally cylindrical curvilinear gripping element and said second generally cylindrical curvilinear gripping element.

15. The method of claim 9, wherein said generally cylindrical handle comprises finger slots for accommodating fingers of said user while said user grips said generally cylindrical handle for maneuvering said hose.

16. The method of claim 9, further comprising rollably connecting said second generally cylindrical curvilinear gripping element to a spindle detachably connected to and substantially perpendicular to said support member at said second end of said support member, wherein said second generally cylindrical curvilinear gripping element rotates about a longitudinal axis common to said second generally cylindrical curvilinear gripping element and said spindle for enabling said hose positioned between said first generally cylindrical curvilinear gripping element and said rollably connected second generally cylindrical curvilinear gripping element to roll smoothly on said rollably connected second generally cylindrical curvilinear gripping element.

17. A hose handling apparatus, comprising:
a support member, said support member comprising a first end, a middle section, and a second end, said support member angled at said middle section;

a generally cylindrical handle detachably connected to and substantially perpendicular to said support member at said first end of said support member to form a rigid connection with said support member, wherein said generally cylindrical handle provides grip to a hand of a user and enables said user to maneuver a hose;

a first generally cylindrical curvilinear gripping element detachably connected to and substantially perpendicular to said support member at said middle section of said support member;

a second generally cylindrical curvilinear gripping element detachably connected to and substantially perpendicular to said support member at said second end of said support member;

a pair of generally circular washers made of a flexible material, said generally circular washers provided around said first generally cylindrical curvilinear gripping element and said second generally cylindrical curvilinear gripping element, wherein said generally circular washers provide a firm grip to said hose and prevent abrasion of said hose;

wherein said generally cylindrical handle, said first generally cylindrical curvilinear gripping element, and said second generally cylindrical curvilinear gripping element form a parallel configuration which is perpendicular to a planar surface of said support member, and wherein said first generally cylindrical curvilinear gripping element and said second generally cylindrical curvilinear gripping element grip said hose positioned between said first generally cylindrical curvilinear gripping element and said second generally cylindrical curvilinear gripping element;

whereby said generally cylindrical handle provides a stable grip to said user on said hose handling apparatus for maneuvering and advancing said hose gripped between said first generally cylindrical curvilinear gripping element and said second generally cylindrical curvilinear gripping element.

* * * * *